United States Patent
Keller et al.

(10) Patent No.: US 12,430,428 B2
(45) Date of Patent: Sep. 30, 2025

(54) DETERMINING ANOMALOUS TOOL INVOCATIONS BY APPLICATIONS USING LARGE GENERATIVE MODELS

(71) Applicant: Microsoft Technology Licensing, LLC, Redmond, WA (US)

(72) Inventors: Ron Keller, Ramat Hasharon (IL); Idan Hen, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 18/510,331

(22) Filed: Nov. 15, 2023

(65) Prior Publication Data

US 2025/0156535 A1    May 15, 2025

(51) Int. Cl.
    *H04L 9/40*     (2022.01)
    *G06F 21/52*    (2013.01)
    *G06F 21/55*    (2013.01)

(52) U.S. Cl.
    CPC .................. *G06F 21/554* (2013.01)

(58) Field of Classification Search
    CPC ..................................... G06F 21/554
    USPC ............................................... 726/22
    See application file for complete search history.

(56) References Cited

U.S. PATENT DOCUMENTS

| | | | | |
|---|---|---|---|---|
| 2024/0330935 A1* | 10/2024 | Abdelrahman | ........... | H04L 9/50 |
| 2024/0333741 A1* | 10/2024 | Abdelrahman | ...... | G06Q 20/382 |
| 2024/0403560 A1* | 12/2024 | Radu | ..................... | G06F 40/284 |
| 2024/0427807 A1* | 12/2024 | Corlatescu | .......... | G06F 16/3325 |
| 2025/0045531 A1* | 2/2025 | Hayes | ..................... | G06F 40/56 |
| 2025/0094137 A1* | 3/2025 | Du | ............................. | G06F 8/33 |
| 2025/0111051 A1* | 4/2025 | Mantin | ................... | G06F 21/54 |
| 2025/0131245 A1* | 4/2025 | Ashok | .................... | G06N 3/088 |
| 2025/0131261 A1* | 4/2025 | Harang | ................. | G06N 20/00 |

OTHER PUBLICATIONS

Armstrong, et al., "Using GPT-Eliezer against ChatGPT Jailbreaking—AI Alignment Forum", Retrieved from URL: https://www.alignmentforum.org/posts/pNcFYZnPdXyL2RfgA/using-gpt-eliezer-against-chatgpt-jailbreaking, Dec. 6, 2022, pp. 1-18.

(Continued)

*Primary Examiner* — Haresh N Patel
(74) *Attorney, Agent, or Firm* — Ray Quinney & Nebeker P.C.; James S. Bullough

(57) ABSTRACT

This disclosure relates to utilizing a threat detection system to detect anomalous actions provided by a compromised large generative language model (LLM). For instance, the threat detection system utilizes a detection-based large generative model to process select communication between an application system and the LLM and determine when the LLM may have been potentially compromised. In various implementations, utilizing the detection-based large generative model, the threat detection system determines when an LLM is improperly instructing an application system to invoke tools to perform unapproved actions. Furthermore, when an LLM becomes compromised, the threat detection system intelligently safeguards the detection-based large generative model against similar threats that seek to evade detection or compromise the detection-based large generative model.

20 Claims, 8 Drawing Sheets

(56) References Cited

OTHER PUBLICATIONS

International Search Report and Written Opinion received for PCT Application No. PCT/US2024/051687, mailed on Feb. 5, 2025, 13 pages.

Phute, et al., "LLM Self Defense: By Self Examination, LLMs Know They Are Being Tricked",, Retrieved from URL: https://arxiv.org/abs/2308.07308v3, Oct. 24, 2023, pp. 1-11.

Shayegani, et al., "Survey of Vulnerabilities in Large Language Models Revealed by Adversarial Attacks", arxiv.org, Cornell University Library, 201 Olin Library Cornell University Ithaca, NY 14853, Oct. 16, 2023, pp. 1-54.

* cited by examiner

US 12,430,428 B2

DETERMINING ANOMALOUS TOOL INVOCATIONS BY APPLICATIONS USING LARGE GENERATIVE MODELS

BACKGROUND

The landscape of computational devices has witnessed substantial progress in both hardware and software domains, with a particular focus on the deployment of generative artificial intelligence (AI) models for executing tasks. The enhanced capabilities of these models have led to their widespread adoption across various systems and applications. However, many generative AI models still include vulnerabilities, which are increasingly being targeted by malicious entities. For example, threat actors are exploiting weak points in generative AI models to manipulate and misuse them. Furthermore, threat actors are finding ways to leverage these vulnerabilities to compromise the integrity of systems and applications linked to these models.

BRIEF DESCRIPTION OF THE DRAWINGS

The following detailed description provides specific and detailed implementations accompanied by drawings. Additionally, each of the figures listed below corresponds to one or more implementations discussed in this disclosure.

DETAILED DESCRIPTION

Figure 1:
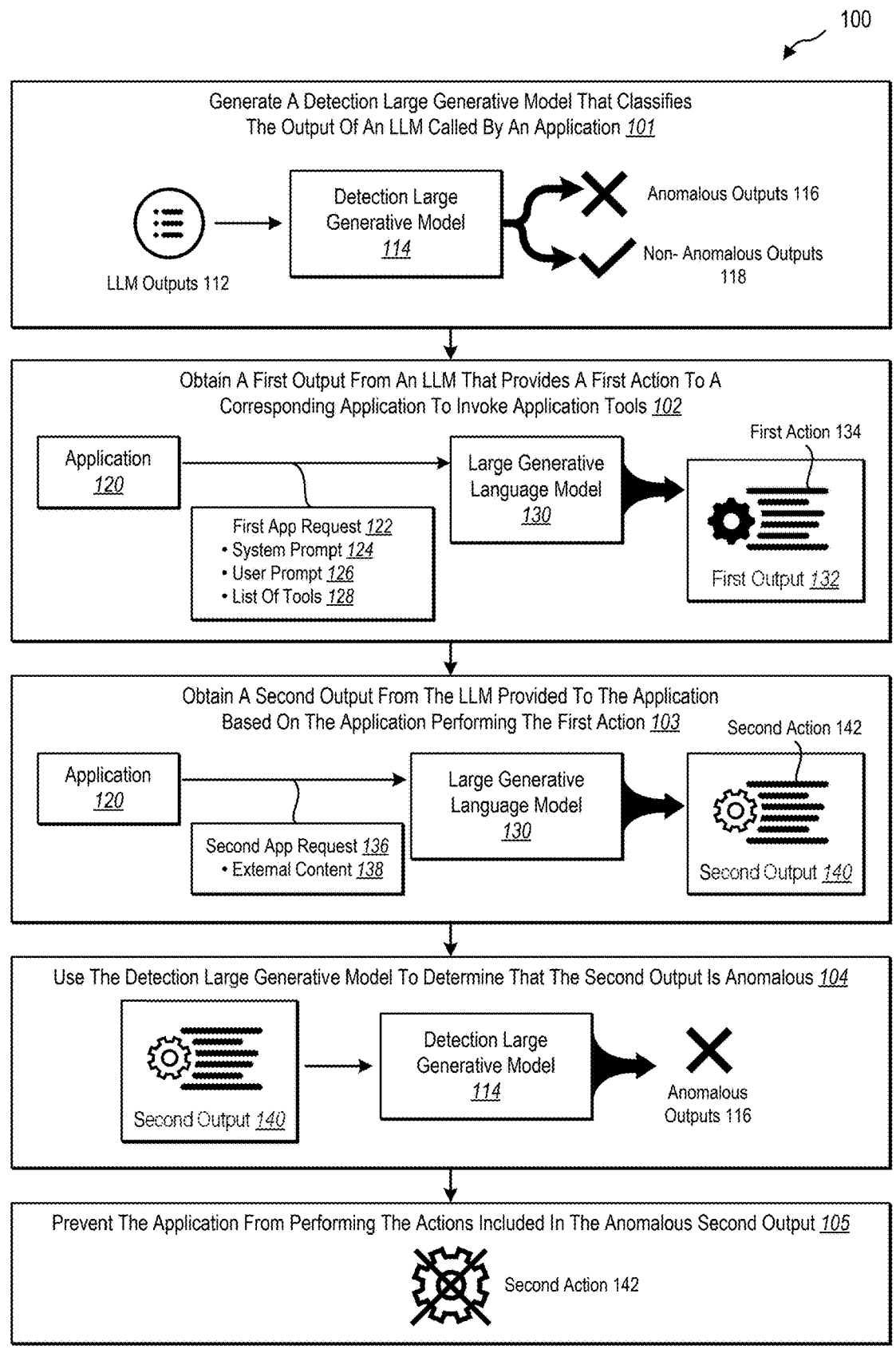
FIG. 1 illustrates an example overview of the threat detection system using a detection-based large generative model to detect anomalous outputs and prevent applications for performing anomalous actions.

This disclosure describes utilizing a threat detection system to detect anomalous actions provided by a compromised large generative language model (LLM). For instance, the threat detection system utilizes a detection-based large generative model to process select communication between an application system and the LLM and determine when the LLM may have been potentially compromised. In various implementations, utilizing the detection-based large generative model, the threat detection system determines when an LLM is improperly instructing an application system to invoke tools to perform unapproved actions. Furthermore, when an LLM becomes compromised, the threat detection system intelligently safeguards the detection-based large generative model against similar threats that seek to evade detection or compromise the detection-based large generative model.

By way of example, consider the following scenario where a user requests an application to perform a target action, such as generating an external website within a word-processing document. The application provides the user prompt, a system prompt, and a list of available tools to an LLM for guidance on how to accomplish the target action. In response, the LLM generates a first output directing the application to use a web tool from the list of tools to retrieve the content of the website and provide it back to the LLM. Upon the application doing so and providing the external content to the LLM, the LLM generates a second output to the application. If the external content includes malicious context, such as an indirect prompt injection attack, then the LLM may be misled to perform malicious or unauthorized operations. Similarly, the LLM may generate output directing the application to improperly use the available tools to perform unapproved operations, such as exfiltrating private data from an entity and covertly providing it to a threat actor.

The threat detection system detects and prevents threat actors from causing the application to improperly invoke tools. In some instances, the threat detection system also prevents a compromised LLM from sharing outputs that violate responsible AI considerations. Further, while the threat detection system uses a detection-based large generative model to detect these and other security threats, it also safeguards itself from the same times of attack vectors that can exploit vulnerabilities of and/or compromise LLMs used by applications, as further described below. Indeed, implementations of the present disclosure provide benefits and solve problems in the art with systems, computer-readable media, and computer-implemented methods using a threat detection system that uses a detection-based large generative model to detect anomalous outputs from an LLM used by an application system.

As described in this disclosure, the threat detection system delivers several significant technical benefits in terms of improved computing security and accuracy compared to existing systems. Moreover, the threat detection system provides several practical applications that address problems related to detecting and preventing threat actors from using applications to improperly invoke tools that may compromise an entity's data and LLMs from sharing improper outputs.

To elaborate, in one or more implementations, the threat detection system identifies a first application request between an application and an LLM where the application request includes a system prompt, a user prompt, and, in some cases, a list of tools available to the application. The LLM generates a first output with a first action for the application to perform to complete the user request. In response to the application performing the first action and providing a second application request to the large generative language model, the threat detection system obtains a second output from the LLM instructing the application to perform a second action. In this example, the threat detection system uses a detection-based large generative model to determine that the second output from the LLM is anomalous. Based on the second output being anomalous, the threat detection system notifies and/or prevents the application from performing the second action.

By using the detection-based large generative model on LLM outputs, the threat detection system detects potential security breaches in an application system. For example, the threat detection system uses the detection-based large generative model to determine when an LLM output is anomalous and, if so, blocks the directions, actions, and content included in the anomalous output. For instance, the threat detection system prevents an application from improperly invoking tools to perform unapproved actions that compromise private data and/or breach security measures.

In another instance, the threat detection system can detect when an LLM includes inappropriate content, even if the anomaly does not direct an application to invoke tools to perform unapproved actions. In these instances, the threat detection system prevents inappropriate content from being shared or propagated within the application or an entity's system.

By processing only select communications between an application system and the corresponding LLM, the threat detection system safeguards itself from being compromised by indirect prompt injection attacks aimed at compromising detection and/or exploiting vulnerabilities of the detection-based large generative model. In particular, the threat detection system prevents external content from being input into the detection-based large generative model ensuring accurate classifications of LLM outputs without becoming compromised itself.

To elaborate, the threat detection system allows the original, first application request from the application to the LLM to be provided to the detection-based large generative model (e.g., the first application request including the system prompt, the user prompt, and/or a list of tools available to the application). In addition, the threat detection system allows LLM outputs to be provided and classified by the detection-based large generative model. However, the threat detection system prevents other application requests from the application to the LLM from being used as input, as these application requests may include compromised content. This way, the threat detection system ensures that the detection-based large generative model remains protected from third-party actors and/or threat actors seeking to avoid detection.

Furthermore, the threat detection system provides flexibility by optionally integrating into an application system. For example, in some implementations, the threat detection system is located within an application system and directly detects and prevents the application from improperly invoking tools. In some implementations, the threat detection system is located in a separate system but still detects, notifies, and prevents tools from being improperly invoked by an application within a separate application system.

As illustrated in the foregoing discussion, this disclosure utilizes a variety of terms to describe the features and advantages of one or more implementations described. To illustrate, this disclosure describes the threat detection system in the context of a cloud computing system.

For example, the term "machine learning" refers to algorithms that generate data-driven predictions or decisions from known input data by modeling high-level abstractions. Examples of machine-learning models include computer representations that are tunable (e.g., trainable) based on inputs to approximate unknown functions. For instance, a machine-learning model includes a model that utilizes algorithms to learn from, and make predictions on, known data by analyzing the known data to learn to generate outputs that reflect patterns and attributes of the known data. Examples of machine-learning models include latent Dirichlet allocation (LDA), multi-arm bandit models, linear regression models, logistic regression models, random forest models, support vector machines (SVMs) models, neural networks (convolutional neural networks (CNNs), recurrent neural networks such as LSTMs, graph neural networks, etc.), or decision tree models.

As an example, a "large generative model" (LGM) is a large artificial intelligence system that uses deep learning to produce coherent and contextually relevant text based on patterns learned from large amounts of training data. In various implementations, a generative learning model, such as a multi-modal generative model. In many instances, a generative model refers to an advanced computational system that uses natural language processing, machine learning, and/or image processing to generate coherent and contextually relevant human-like responses.

Large generative models include large generative language models (LLMs), which are primarily based on transformer architectures to understand, generate, and manipulate human language. LLMs can also use a recurrent neural network (RNN) architecture, long short-term memory (LSTM) model architecture, convolutional neural network (CNN) architecture, or other architecture types. Examples of LLMs include generative pre-trained transformer (GPT) models including GPT-3.5 and GPT-4, bidirectional encoder representations from transformers (BERT) model, text-to-text transfer transformer models such as T5, conditional transformer language (CTRL) models, and Turing-NLG. Other types of large generative models include sequence-to-sequence models (Seq2Seq), vanilla RNNs, and LSTM networks.

Large generative models have a large number of parameters (e.g., in the billions or trillions) and are trained on a vast dataset to produce fluent, coherent, and topic-specific outputs (e.g., text and/or images). Large generative models have applications in natural language understanding, content generation, text summarization, dialog systems, language translation, creative writing assistance, and image generation. A single large generative model performs a wide range of tasks based on receiving different inputs, such as prompts (e.g., input instructions, rules, example inputs, example outputs, and/or tasks), data, and/or access to data. In response, the large generative model generates various output formats ranging from one-word answers to long narratives, images and videos, labeled datasets, documents, tables, and presentations.

Another example of a large generative model is a detection-based large generative model. A "detection-based large generative model" refers to a large generative model that is generated, trained, and/or fine-tuned to detect anomalous outputs of an LLM. For example, a detection-based large generative model classifies LLM outputs as anomalous or non-anomalous. Additional details regarding detection-based large generative models are provided below.

As used in this disclosure, the term "user request" or "user prompt" refers to text or other inputs provided by a user to an application to perform a target action, service, or task. In some implementations, a user prompt includes user input requesting the application to provide or generate a target result. In one or more implementations, a user prompt includes a specific set of instructions, queries, or commands entered by a user to obtain a desired output. In various implementations, a user prompt provides context and purpose to the user request, such as outlining a user's intent for an interaction.

As used in this disclosure, the term "application request" refers to a structured data packet transmitted by an application to the LLM system. In various implementations, the application generates and provides the application request in response to a user prompt. In some implementations, an application request includes the user prompt, a system prompt, and/or a list of tools. In some implementations, an application request includes context or data requested by the LLM from a previous output. For example, a second request includes data that the application obtained using a tool as directed in a first LLM output.

In this disclosure, the term "system prompt" refers to contextual information or directives provided to the LLM by the application, application system, and/or entity. In some instances, a system prompt is a system-level prompt that provides important context information, such as meta-information about a domain, to the LLM. In some implementations, a system prompt includes general framing information to ensure that the large generative model understands the correct context, syntax, and grounding information of the data it is processing. Additionally, in various implementations, a system prompt can include specific guidelines, limitations, or parameters within which the LLM should operate.

The term "tools" refers to resources, sub-applications, or utilities accessible to the application within an application system. These tools can encompass a variety of functionalities, such as web-based tools, software applications, or other resources that the application can leverage to enhance its responses. By providing a list of tools to the LLM, the LLM can direct the application on how to use one or more tools efficiently to fulfill the user request. In some implementations, the tools are provided to the LLM as a set (e.g., a non-empty set), class, or group. In various implementations, the tools available to an application are defined within a system prompt.

In this disclosure, the term "LLM output" refers to the generated content or responses produced by the large generative language model based on the given input. The LLM output encompasses any form of textual, numerical, or multimedia information generated by the LLM. In many instances, the LLM output includes one or more actions for the application to perform using one or more tools available to the application.

The term "anomalous LLM output" refers to responses from the LLM that deviate significantly from the expected patterns or contexts of generated content. These outputs are unusual, unexpected, or divergent from what the LLM usually produces in response to a given input. An anomalous LLM output may indicate potential security breaches, suspicious activities, or unusual system behavior as a result of an indirect prompt injection attack. In particular, anomalous LLM output indicates abnormal application behavior (e.g., irregularly invoking tools) signaling that the LLM is potentially compromised by an indirect prompt injection attack. On the other hand, the term "non-anomalous LLM output" refers to responses that align with the expected, normal patterns or contexts of generated content.

Additionally, the term "indirect prompt injection attack" refers to a cybersecurity threat where an attacker (e.g., a threat actor) manipulates an application, system, or model (e.g., an LLM) to generate misleading prompts, leading the application to perform unintended actions without the knowledge or consent of users or the entity that implements the application. In many instances, an indirect prompt injection attack aims to exploit the vulnerabilities of an LLM. This type of attack typically involves inserting malicious code or crafted inputs as input prompts to an LLM, which are then processed by the LLM to directly or indirectly perform unapproved actions or share unapproved information.

Additionally, as an example, a "network" refers to one or more data links that enable electronic data transport between computer systems and/or modules and/or other electronic devices. A network may include public networks such as the Internet as well as private networks. When information is transferred or provided over a network or another communications connection (either hardwired, wireless, or a combination of hardwired or wireless) to a computer, the computer properly views the connection as a transmission medium. Transmission media can include a network and/or data links that can be used to carry the needed program code means in the form of computer-executable instructions or data structures and which can be accessed by a general-purpose or special-purpose computer. Combinations of the above are also included within the scope of computer-readable media.

Implementation examples and details of the threat detection system are discussed in connection with the accompanying figures, which are described next. For example, FIG. 1 illustrates an example overview of the threat detection system using a detection-based large generative model to detect anomalous outputs and prevent applications for performing anomalous actions according to some implementations. As shown, FIG. 1 illustrates a series of acts 100 performed by or with the threat detection system to prevent security risks from threat actors.

As shown, the series of acts 100 includes act 101 of generating a detection-based large generative that classifies the output of an LLM when called by an application. For example, the threat detection system generates, trains, or otherwise obtains a detection-based large generative model 114 that classifies LLM outputs 112 from application requests as either an anomalous output 116 or a non-anomalous output 118. Additional details regarding generating a detection-based large generative model are provided below in connection with FIG. 4.

As shown in FIG. 1, act 102 includes obtaining a first output from an LLM that provides a first action to a corresponding application to invoke application tools. In one or more implementations, an application 120 provides or sends a first application request 122 to a large generative language model 130 (LLM). For example, the application 120 identifies or receives a user prompt 126 requesting that the application 120 perform a target task. In response, the application 120 queries the large generative language model 130 for instructions on how to use available tools to efficiently accomplish the task.

As shown in act 102, the application 120 provides a first application request 122, which includes a system prompt 124, the user prompt 126, and a list of tools 128 to the large generative language model 130. The large generative language model 130 processes the first application request 122 and generates a first output 132 that includes a first action 134 for the application 120 to perform to accomplish the user-requested task. In various implementations, the first action 134 directs the application 120 to use one or more tools from the list of tools 128.

In FIG. 1, act 103 includes obtaining a second output from the LLM provided to the application based on the application performing the first action. In some instances, the large generative language model 130 provides piecemeal instructions to the application 120. For example, the first action 134 in the first output 132 instructs the application 120 to obtain external content for the large generative language model 130 to process. In these instances, the application 120 provides a second application request 136 that includes the external content 138. In response, the LLM processes the application requests and the external content 138 and generates a second output 140. In various instances, the second output 140 includes a second action 142 for the application 120 to further perform and/or tools to invoke.

As mentioned above, the threat detection system classifies the LLM outputs 112 to detect anomalous outputs. With the first output 132, the threat detection system may determine that the first action 134 was a non-anomalous output 118. However, if the large generative language model 130 becomes compromised from the external content 138, the threat detection system detects that subsequent outputs from the large generative language model 130 may be anomalous.

Accordingly, as shown, act 104 includes the threat detection system using the detection-based large generative model 114 to determine that the second output 140 is an anomalous output 116. Based on this determination, the threat detection system further determines that a threat actor used the first action 134 to import an indirect prompt injection attack via the external content 138 into the large generative language model 130. Additional details regarding using the detection-based large generative model to classify LLM outputs are provided below in connection with FIGS. 5A-5B.

As shown in FIG. 1, act 105 shows the threat detection system preventing the application 120 from performing the actions included in the anomalous second output. For instance, the threat detection system notifies the application 120 that the large generative language model 130 is compromised and terminates the user request to prevent the application 120 from taking the second action 142 and/or other actions that exploit vulnerabilities of the LLM or the application system.

Figure 2:
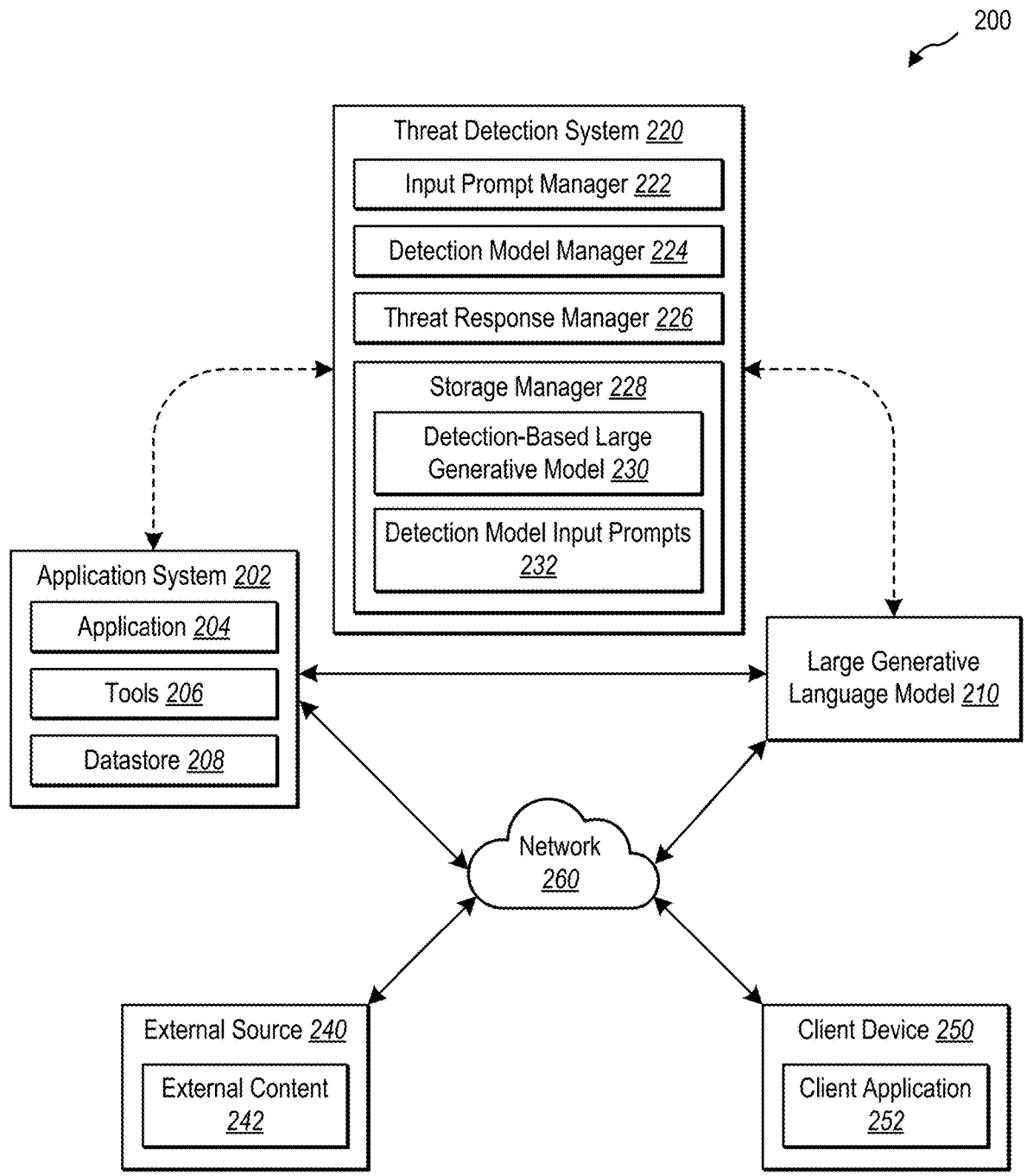
FIG. 2 illustrates an example computing environment where the threat detection system is implemented.

With a general overview in place, additional details are provided regarding the components, features, and elements of the threat detection system. To illustrate, FIG. 2 shows an example computing environment where the threat detection system is implemented according to some implementations. In particular, FIG. 2 illustrates an example of a computing environment 200 of various computing devices associated with a threat detection system 220. While FIG. 2 shows example arrangements and configurations of the computing environment 200, the threat detection system 220, and associated components, other arrangements and configurations are possible.

As shown, the computing environment 200 includes an application system 202, a large generative language model 210 (LLM), the threat detection system 220, an external source 240, and a client device 250 connected via a network 260. Each of these components may be implemented on one or more computing devices, such as on a set of one or more server devices. Further details regarding computing devices are provided below in connection with FIG. 7 along with additional details regarding networks, such as the network 260 shown.

The application system 202 includes an application 204, tools 206, and a datastore 208. For example, the application 204 uses the tools 206 to perform various functions. In addition, the application 204 provides enhanced features to users based on receiving directions and/or instructions from the large generative language model 210. In other words, by coupling the application 204 with the large generative language model 210, the application system 202 begins to envision features and functions not previously available. By providing access to tools 206, the application system 202 is able to make many of these features and functions a reality. Furthermore, the tools 206 allow the large generative language model 210 to efficiently accomplish certain tasks and requests that the LLM is unable to efficiently accomplish.

As shown, the application system 202 includes the datastore 208. In various implementations, the application system 202 is associated with an entity, such as a user, business, or organization. Often, many of the tools 206 allow the application 204 to access data from the datastore 208 to perform various tasks. In some instances, the datastore 208 includes sensitive, private, and/or protected data that is safeguarded within the application system 202. The datastore 208 may represent a database, a set of storage devices, protected cloud storage, or another type of data structure.

The large generative language model 210 may refer to an LLM as provided above. In some implementations, the large generative language model 210 is located within the application system 202. In various implementations, the large generative language model 210 is outside of the application system 202 and provides LLM outputs to various application systems and/or other entities. In these implementations, the application system 202 communicates with the large generative language model 210 via a secure connection.

As shown, the computing environment 200 includes the external source 240, which includes external content 242. In various implementations, the external source 240 is web-based, such as a server or datastore that stores and/or maintains content, including the external content 242. For example, the external source is a website that includes text as the external content 242. For ease of explanation, in this disclosure, the external content 242 often includes an indirect prompt injection attack associated with a threat actor that is embedded or included in the external content 242.

As shown, the computing environment 200 includes the client device 250. In various implementations, the client device 250 is associated with a user (e.g., a user client device), such as a user who uses the application 204 and provides user requests. For example, the client device 250 includes a client application 252, such as a web browser, mobile application, or another form of computer application for accessing and/or interacting with the application 204.

As also shown, the computing environment 200 includes the threat detection system 220. In various implementations, the threat detection system 220 is located within an entity's system, such as an enterprise environment, that implements the application system 202. In some implementations, the threat detection system 220 is located within a cloud computing system. In one or more implementations, the threat detection system 220 is located across multiple devices, such as a portion on a cloud computing system and a portion on the client device 250.

As mentioned earlier, the threat detection system 220 determines, detects, classifies, and/or prevents threat actors from unauthorized access to the application system 202 for applications that utilize an LLM. For example, the threat detection system 220 obtains, identifies, receives, accesses, monitors, and/or otherwise obtains communications between the application 204 and the large generative language model 210. As noted above, the threat detection system 220 may be part of the application system 202 and/or part of a separate entity outside of the application system 202.

As shown, the threat detection system 220 includes various components and elements, which are implemented in hardware and/or software. For example, the threat detection system 220 includes an input prompt manager 222, a detection model manager 224, a threat response manager 226, and a storage manager 228 with a detection-based large generative model 230 and detection model input prompts 232.

In various implementations, the input prompt manager 222 selectively manages application prompts provided to the large generative language model 210 from the application system 202 and LLM outputs return to the application system 202 from the large generative language model 210. In various implementations, the input prompt manager 222 receives a copy of an initial application prompt from the application 204 but blocks subsequent application prompts that may include external and/or third-party content. From the data received from the application system 202 and the large generative language model 210, in various implementations, the input prompt manager 222 generates detection model input prompts 232 to provide to the detection-based large generative model 230.

In various implementations, the detection model manager 224 manages the detection-based large generative model 230. For example, the detection model manager 224 manages generating, training, fine-tuning, and inferencing the detection-based large generative model 230. In some implementations, the threat response manager 226 responds to an anomalous determination by the detection model manager 224. For example, the threat response manager 226 notifies the application system 202 and/or the application 204 of the anomalous LLM output to prevent, block, signal, and/or flag any included actions from being implemented or shared from the application system 202. In various implementations, the threat response manager 226 directly or indirectly prevents an indirect prompt injection attack of the LLM from penetrating and/or exploiting vulnerabilities of the application system 202.

Figure 3A:
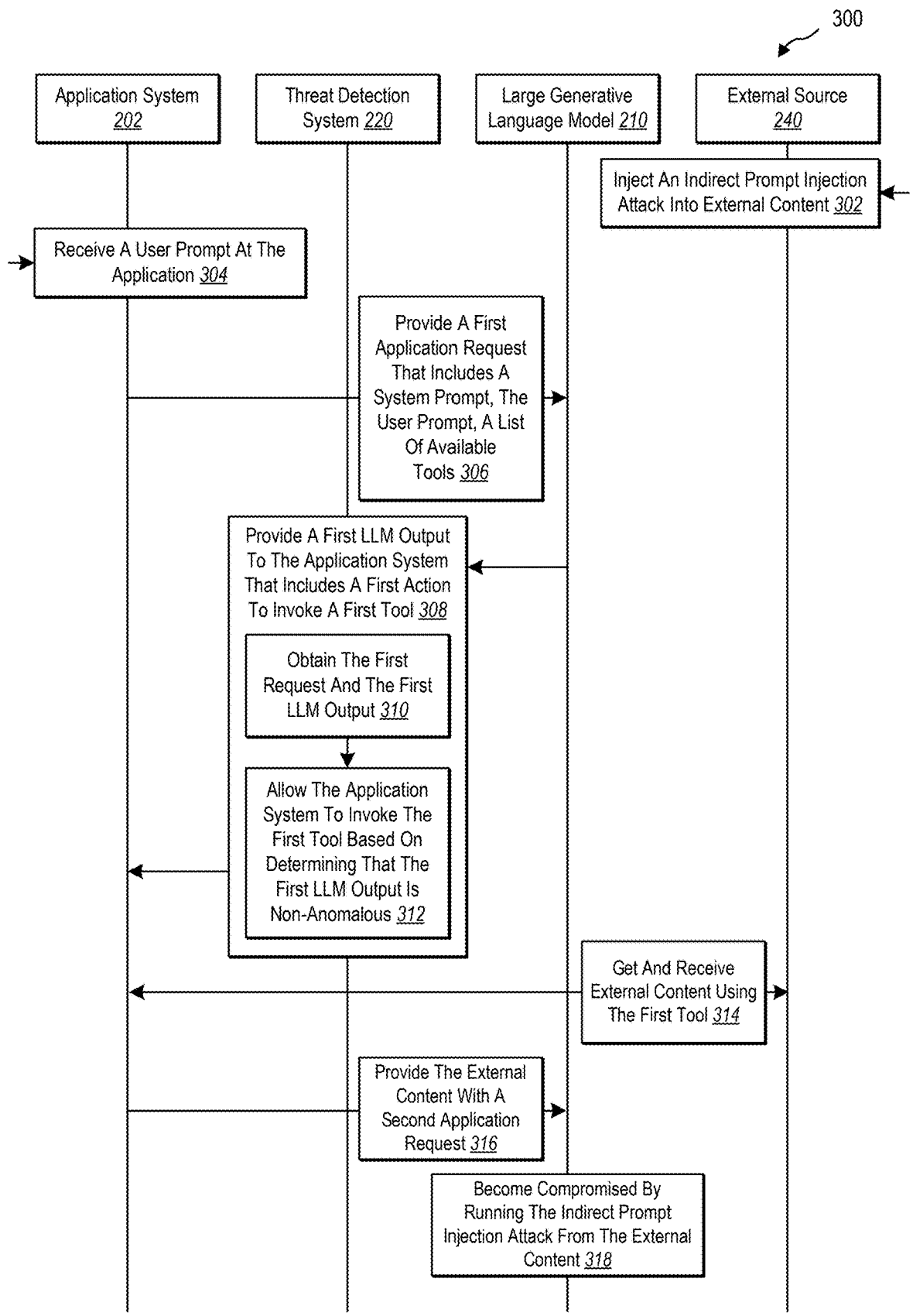
FIGS. 3A-3B illustrate an example sequence diagram of using a detection-based large generative model to detect a large generative language model providing anomalous directions to an application system that invokes tools.
Figure 3B:
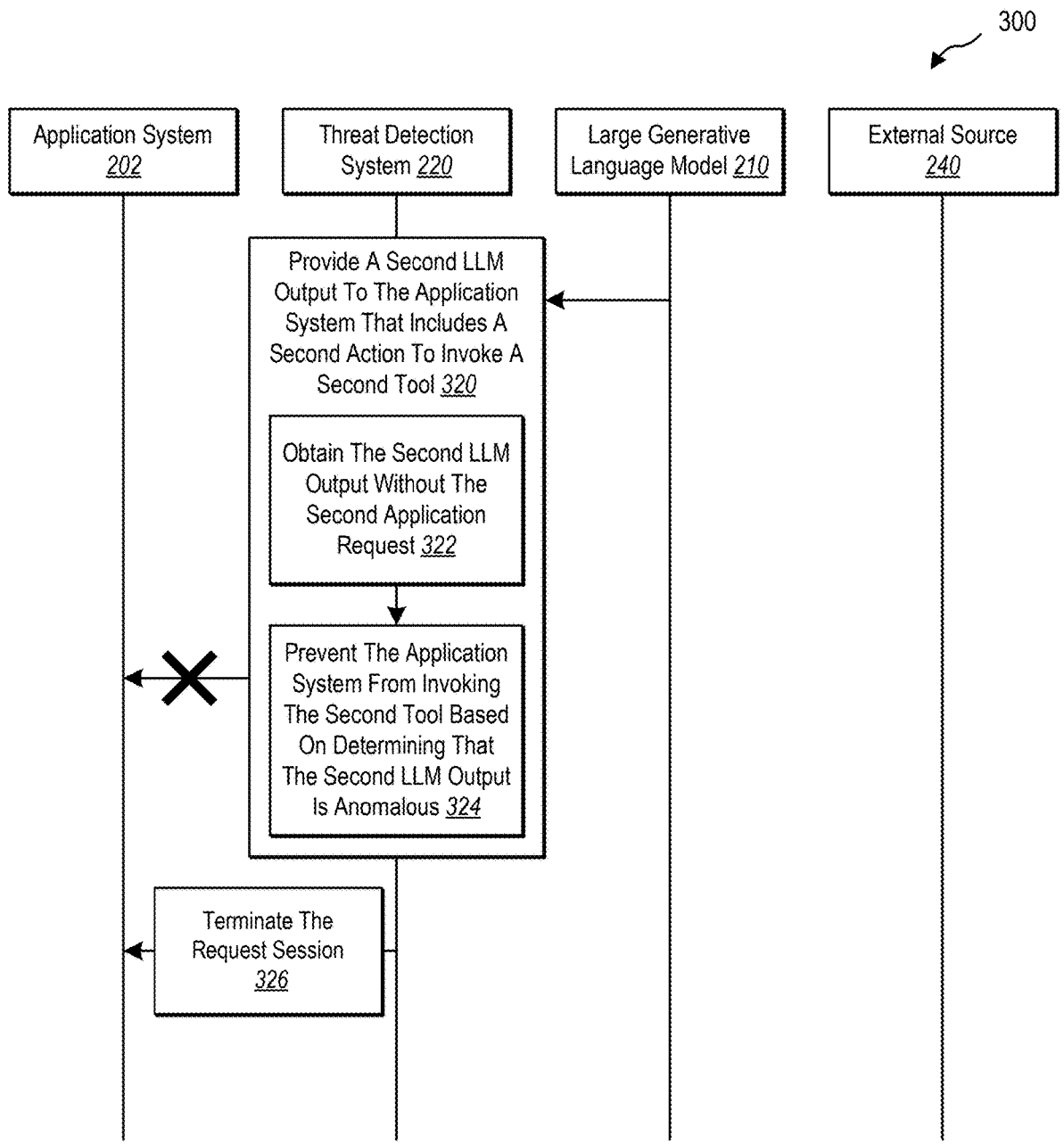

FIGS. 3A-3B illustrate an example sequence diagram of using a detection-based large generative model to detect a large generative language model providing anomalous directions to an application system that invokes tools. As shown, FIGS. 3A-3B include various components in communication with each other, including the application system 202, threat detection system 220, large generative language model 210, and external source 240. FIGS. 3A-3B also include a series of acts 300 performed by or with the threat detection system 220 for determining anomalous directions from the large generative language model 210 to the application system 202 to perform suspicious activities that would otherwise go undetected.

As shown in FIG. 3A, act 302 includes injecting an indirect prompt injection attack into the external content at the external source 240. For example, a threat actor explicitly or covertly adds an indirect prompt injection attack to the content of an external source. Then, when other services access the content of the external source 240 (e.g., the external content), the indirect prompt injection attack is included in the provided data. Threat actors can use various ways to embed an indirect prompt injection attack and other malicious content into the content of the external source 240.

In act 304, the application system 202 receives a user prompt at an application. For instance, the application provides various functions to a user, including the ability for a user to input requests to the application. For example, the application is an office-based application that provides email, word processing, spreadsheet, presentation, and/or database functionality, and the application receives user input to automatically perform user-requested tasks. In another example, the application is an image or video editing program that allows a user to request automatic edits of content. In one or more implementations, the application receives user input in the form of text or audio commands.

For example, the application receives the user prompt, "Can you please summarize LLM output www.science-news.com/Article-A?".

In act 306, the application system 202 provides a first application request to the large generative language model 210. As shown, the first application request includes a system prompt, the user prompt, and a list of available tools. In various implementations, the application is uncertain how to accomplish the user request. Further, while the application has access to various tools, it may not know how to use the tools or the best combinations of tools and commands to fulfill the request quickly and efficiently. Accordingly, the application sends the first application request to the large generative language model 210 for answers and/or guidance on how to use the available tools to fulfill the user request efficiently.

As shown, the first application request includes various prompts. The system prompt, as provided above, provides a framework and context to the large generative language model 210. For example, a system prompt includes "You are an advanced automated assistant for Application A and are tasked with determining efficient ways to answer customer requests." In addition, a system prompt may include the list of available tools along with their functions. In various implementations, the large generative language model 210 determines whether it can directly complete a user request or if it is more accurate and/or efficient to use one or more available tools (called by the application system 202) to complete some or all of a user request.

The application request also includes the user prompt. In some implementations, the application system 202 forwards the user prompt. For example, the user prompt includes "Please write a summary report on www.science-news.com/Article-A." In various implementations, the application system 202 modifies and/or edits the user prompt. For instance, the application system 202 shortens or rewrites the user prompt. In some instances, the application system 202 only provides a portion of the user prompt in the application request.

The list of available tools in the application prompt may be included in the system prompt or included as a separate list. In some instances, the list of tools includes functions of the tools that enable the application system 202 to determine which tools to use to accurately and efficiently accomplish a task. Depending on the application system 202, the available tools may vary across a range of functions. In various instances, the application prompt does not include the list of tools available to the application system 202 (e.g., the large generative language model 210 maintains a list or directly answers the user prompt).

As shown in FIG. 3A, act 308 includes the large generative language model 210 providing a first LLM output to the application system 202 that includes a first action to invoke a first tool. For example, based on processing the application request, the large generative language model 210 determines whether tools are needed to complete the user request and, if so, provides a framework to answer the user prompt using tools from the list of available tools.

In some instances, the large generative language model 210 is unable to invoke the tools, such as for privacy or security reasons (e.g., a tool accesses a private datastore within the application system 202 and the large generative language model 210 is located outside of the threat detection system 220). Accordingly, the large generative language model 210 directs the application system 202 (e.g., an application within the application system 202) to invoke one or more tools.

Additionally, in various instances, the framework includes multiple communications with the application system 202, where different LLM outputs direct the application system 202 to invoke different tools. For example, if the user prompt includes a request to summarize one or more web pages, the large generative language model 210 first needs to obtain the content of the web pages. When a tool within the application system 202 provides the functionality to get or fetch webpage data, the large generative language model 210 directs the application system 202 to invoke that tool and return the requested content to be summarized.

In the illustrated implementation, the threat detection system 220 intercepts the first LLM output before it is provided to or implemented on the application system 202. For instance, the threat detection system 220 identifies or obtains the first request, or a copy of the first request, and determines whether it is anomalous or non-anomalous. This is shown in sub-act 310 of the threat detection system 220 obtaining the first request and the first LLM output. In some instances, the threat detection system 220 identifies or receives the first application prompt and the first LLM output at different points in time.

In particular, the threat detection system 220 utilizes the detection-based large generative model to analyze the first LLM output in the context of the application request. For instance, the detection-based large generative model determines whether the first LLM output is within the range of expected outputs. In additional instances, the detection-based large generative model determines whether the first action is appropriate and/or expected as a user action or whether the first action is anomalous of typical user behavior.

If the first LLM output is determined to be non-anomalous, the threat detection system 220 provides it to the application system 202 and/or notifies the application system 202 granting permission to follow the directions in the first LLM output, which includes invoking the first tool. As shown, sub-act 312 includes the threat detection system 220 allowing the application system 202 to invoke the first tool based on determining that the first LLM output is non-anomalous. Otherwise, if the threat detection system 220 determines that the first LLM output is anomalous, the threat detection system 220 prevents the application system 202 from carrying out the LLM output, as described below. If the first action does not include invoking a tool, the threat detection system 220 may omit or skip this step.

As shown, act 314 includes the application system 202 getting, obtaining, or receiving external content using the first tool from the external source 240. In particular, the first LLM output directs the application system 202 to invoke a tool (e.g., the first tool) to fetch, get, or obtain external content from outside the application system 202. In this example, the application system 202 obtains the external content that includes the indirect prompt injection attack. In some implementations, the application system 202 fetches, gets, or obtains content from within the application system 202 that has been compromised and includes malicious content aimed at exploiting vulnerabilities of the application system 202.

Following the directions of the first LLM output, the application system 202 returns the external content to the large generative language model 210. To illustrate, act 316 includes the application system 202 providing the external content with a second application request to the large generative language model 210. For example, the second application request includes the external content with the indirect prompt injection attack.

By inadvertently allowing the indirect prompt injection attack to be executed on the large generative language model 210, the application system 202 compromises the large generative language model 210, which reflects the intent of the threat actor who embedded the indirect prompt injection attack within the external source 240. As shown in FIG. 3A, act 318 includes the large generative language model 210 becoming compromised when the indirect prompt injection attack is executed from the external content. When the large generative language model 210 is compromised by an indirect prompt injection attack, the application system 202 is unaware that the large generative language model 210 has been compromised and may proceed to perform unapproved actions.

Once compromised, the large generative language model 210 may provide legitimate, but unapproved, instructions to the application system 202. To illustrate, in the above example of the user prompt requesting web pages to be summarized, upon receiving the web pages, the large generative language model 210 would typically generate and provide a summary to the application system 202 to present to the requesting user. However, if the large generative language model 210 is compromised, it may instruct the application system 202 to perform additional actions unrelated to the user request before providing the summary. These additional actions may aim to exploit the application system 202.

To illustrate, FIG. 3B includes act 320 of the large generative language model 210 providing a second LLM output to the application system 202 that includes a second action to invoke a second tool. For example, the second LLM output directs the application system 202 to retrieve private data (e.g., exfiltrate data) from a secured datastore using a database query tool and/or send the private data to the threat actor using an email tool.

The threat detection system 220 detects and prevents the application system 202 from performing these unapproved actions. Further, the threat detection system 220 implements safeguards to prevent itself from being compromised by the same or similar attacks on the large generative language model 210. To illustrate, sub-act 322 includes the threat detection system 220 obtaining the second LLM output without the second application request.

Unlike identifying or obtaining the first application request, the threat detection system 220 does not receive or obtain the second request from the application system 202 as a safeguard against processing external content. To elaborate, the detection-based large generative model is trained to determine whether LLM outputs are anomalous or non-anomalous. Accordingly, the threat detection system 220 need only receive LLM outputs as input to the detection-based large generative model. However, to provide additional context and improve model accuracy, the threat detection system 220 also includes the initial application request as a model input because this application request includes the system prompt and the user prompt (and the list of tools when included).

From a different perspective, the threat detection system 220 does not provide inputs to the detection-based large generative model that may include data from outside of the application system 202 or the large generative language model 210. The LLM outputs from the large generative language model 210 are directly generated and absent of hidden malicious content from external sources. Similarly, the initial application request includes only data provided by the user and the application system 202. However, subsequent application requests may include external content and thus, are not accepted by the threat detection system 220. For instance, in the provided example, the second application request includes the external content with the indirect prompt injection attack.

Further, some hidden attacks in external content are targeted at detectors such as the threat detection system 220. For example, external content may include multiple attack vectors where one attack targets a large generative language model and another attack targets detectors. If the threat detection system 220 were to process this external content, it could itself become compromised and allow the application system 202 to perform unapproved actions As shown, sub-act 324 includes the threat detection system 220 preventing the application system 202 from invoking the second tool based on determining that the second LLM output is anomalous. For example, the threat detection system 220 provides the second LLM output to the detection-based large generative model, which determines that the LLM output is anomalous. Consequently, the threat detection system 220 notifies the application system 202 of the anomalous output and/or prevents the second LLM output from being provided to the application system 202. This way, the application system 202 does not perform the second action.

If the threat detection system 220 determines that the second LLM output is non-anomalous, it may repeat sub-act 312 of allowing the application system 202 to perform the actions in the LLM output including following the directions to invoke the stated tool. Indeed, the threat detection system 220 may approve all LLM outputs that the detection-based large generative model classifies as non-anomalous.

In some implementations, the threat detection system 220 provides previous inputs to the detection-based large generative model. For example, when providing the second LLM output, the threat detection system 220 also provides (or the model reloads) the first LLM output and/or the first application request, which provides additional context to the large generative language model 210. In some instances, the threat detection system 220 only provides the system prompt and/or the user prompt to the large generative language model 210 with the current LLM output as model input.

As shown, the second LLM output includes directions to perform the second action that invokes a second tool. In some instances, the detection-based large generative model determines that the second LLM output is anomalous based on the second action and the second tool. Because invoking the second tool may be an approved action by the application system 202, a threat actor may use a compromised large generative language model to direct the application system 202 to covertly invoke the second tool to perform an unapproved action. Accordingly, the detection-based large generative model processes the second LLM output including the direction to invoke the second tool, and the model determines that this operation is anomalous.

In some implementations, the second LLM output does not include a second action and/or invoking a second tool, but the threat detection system 220 still determines that it is anomalous. For example, the indirect prompt injection attack caused the large generative language model 210 to provide an unapproved output (e.g., output that violates responsible AI policies). In these cases, the threat detection system 220 may analyze the second LLM output and determine that it is anomalous for violating responsible AI policies or given the context of the first application request (e.g., the second LLM output is wholly unrelated to the user prompt).

As shown, when the threat detection system 220 determines that the second LLM is anomalous, the threat detection system 220 performs act 326 of terminating the request session. In some implementations, the threat detection system 220 blocks the second LLM from being provided to the application system 202. In some implementations, the threat detection system 220 notifies the application system 202 of the detected anomalous LLM output and/or anomalous directions in the output. In some implementations, the threat detection system 220 notifies a system administrator and/or user of the detected anomalous LLM output. In some implementations, the threat detection system 220 blocks future access to the external content and/or external source 240.

When the threat detection system 220 is integrated into the application system 202, it can directly block an application from performing anomalous actions. When the threat detection system 220 is outside of the application system 202 (e.g., controlled by a different entity such as a cloud security application), the threat detection system 220 indirectly blocks an application within the application system 202 from performing anomalous actions through notifications and/or approvals.

In one or more implementations, when the large generative language model 210 provides the LLM output to the application system 202 and the threat detection system 220 obtains a copy of the LLM output, the application system 202 waits for approval from the threat detection system 220 before performing any action included in the LLM output. This way, the threat detection system 220 ensures protection for the application system 202 against unapproved and anomalous actions.

In some implementations, the threat detection system 220 blocks and/or flags the threat actor when anomalous actions are detected. For example, in response to determining that the anomalous action was caused by external content from the external source 240, the threat detection system 220 blocks future calls or access to the external source 240. In some instances, the threat detection system 220 causes the threat detection system 220 to use a different large generative language model when the first large generative language model has been compromised.

In various implementations, the threat detection system 220 provides the external content to a large generative language model with a prompt to detect and remove the indirect prompt injection attack. If successful, the threat detection system 220 allows the application system 202 to resend the second application request with the updated external content and process the user request without negative, anomalous actions.

Notably, while this disclosure includes the example of an indirect prompt injection attack embedded in external content being introduced to a large generative language model, the large generative language model may be compromised via other attack vectors. Regardless of how the large generative language model is compromised, the threat detection system 220 detects when the large generative language model provides anomalous LLM outputs that would negatively affect an application system using the large generative language model.

Figure 4:
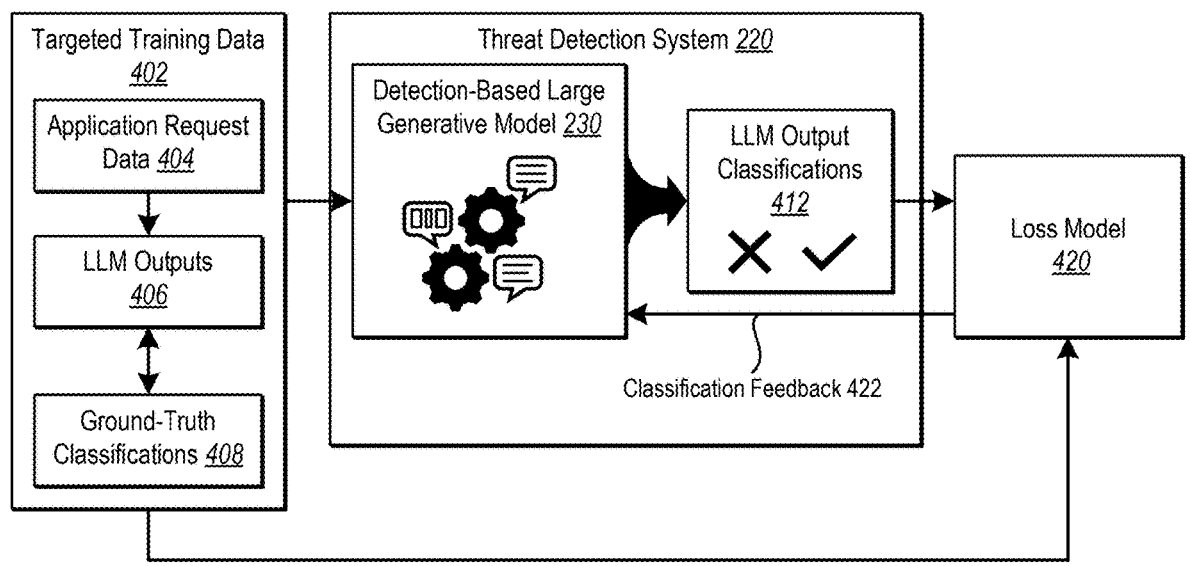
FIG. 4 illustrates an example diagram of generating a detection-based large generative model to determine anomalous and non-anomalous classifications for large generative language model outputs.

As previously mentioned, the threat detection system 220 uses a detection-based large generative model to determine anomalous LLM outputs. FIG. 4 illustrates an example diagram of generating a detection-based large generative model to determine anomalous and non-anomalous classifications for large generative language model outputs according to some implementations.

As shown, FIG. 4 includes the targeted training data 402, a detection-based large generative model 230 that generates LLM output classifications 412, and a loss model 420. The detection-based large generative model 230 and the LLM output classifications 412 are shown as being within the threat detection system 220. In some implementations, the targeted training data 402 and/or the loss model 420 are included in the threat detection system 220. In various implementations, fewer components are included in the threat detection system 220.

The targeted training data 402 includes application request data 404, the LLM outputs 406, and ground-truth classifications 408 corresponding to the LLM outputs 406. In various implementations, the application request data 404 includes data included in initial application requests, such as system prompts, user prompts, and/or lists of available tools. In various implementations, the ground-truth classifications 408 include outputs generated by large generative language models, which may include one or more actions for an application to perform and/or one or more tools for the application to invoke. The ground-truth classifications 408 provide accurate classifications for the LLM outputs 406.

In various implementations, the detection-based large generative model 230 utilizes a large number of parameters (e.g., in the billions or trillions) and deep learning to produce coherent and contextually relevant text based on patterns learned from large amounts of training data. In various implementations, the threat detection system 220 uses the targeted training data 402 to fine-tune the detection-based large generative model 230 to focus on classifying LLM outputs. For example, the threat detection system 220 obtains an initially trained large generative language model and fine-tunes it using the targeted training data 402. In some instances, the threat detection system 220 trains the detection-based large generative model 230 with large datasets but refines the model based on the targeted training data 402 to accurately classify the LLM outputs 406.

While this disclosure describes the detection-based large generative model 230 as a large generative language model, in some implementations, the threat detection system 220 utilizes a classifier machine-learning model to classify the LLM outputs 406. For example, the detection-based large generative model 230 is a convolutional neural network or a transformer neural network that encodes inputs into feature vectors, decodes the feature vectors, and classifies the data (e.g., a SoftMax or a sigmoid function) to determine whether an LLM output is anomalous or non-anomalous.

As shown, the detection-based large generative model 230 generates LLM output classifications 412, which classify the LLM outputs 406 as either anomalous or non-anomalous. In some implementations, the LLM output classifications 412 include an anomalous probability and/or reasons why an LLM output was flagged as anomalous.

As shown, FIG. 4 includes the loss model 420, which may have one or more loss functions (e.g., cross-entropy loss and/or similarity loss). In various implementations, the threat detection system 220 uses the loss model 420 to determine an error or loss amount, which the threat detection system 220 provides back to the detection-based large generative model 230 as classification feedback 422 to train and fine-tune the detection-based large generative model 230. For example, the threat detection system 220 compares the ground-truth classifications 408 to the LLM output classifications 412 using the loss model 420 to generate the classification feedback 422 indicating an error or loss amount. The LLM output classifications 412 are generated by the detection-based large generative model 230 based on application request data 404 corresponding to the ground-truth classifications 408.

In one or more implementations, the threat detection system 220 uses the classification feedback 422 to train, optimize, and/or fine-tune the detection-based large generative model 230 through various techniques, such as backpropagation and/or end-to-end learning. The threat detection system 220 may iteratively fine-tune and train the neural networks until they converge, for a set number of iterations, until the training data is exhausted, or until a satisfactory level of accuracy is achieved.

Figure 5A:
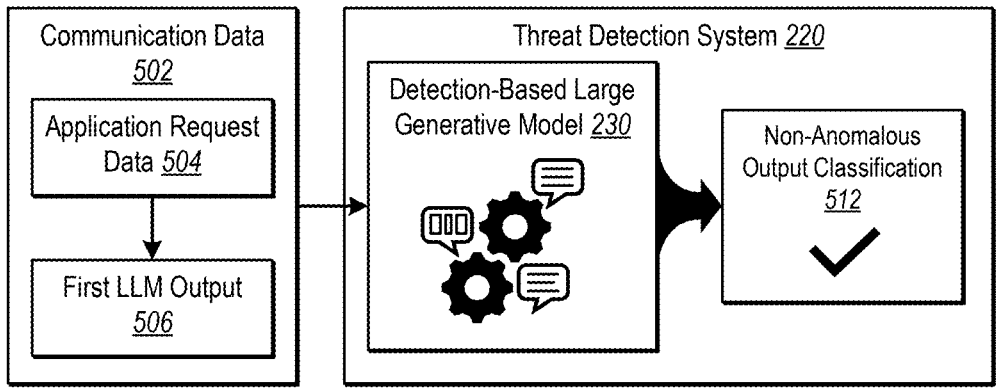
FIGS. 5A-5B illustrate example diagrams of using the detection-based large generative model to determine anomalous and non-anomalous large generative language model output classifications.
Figure 5B:
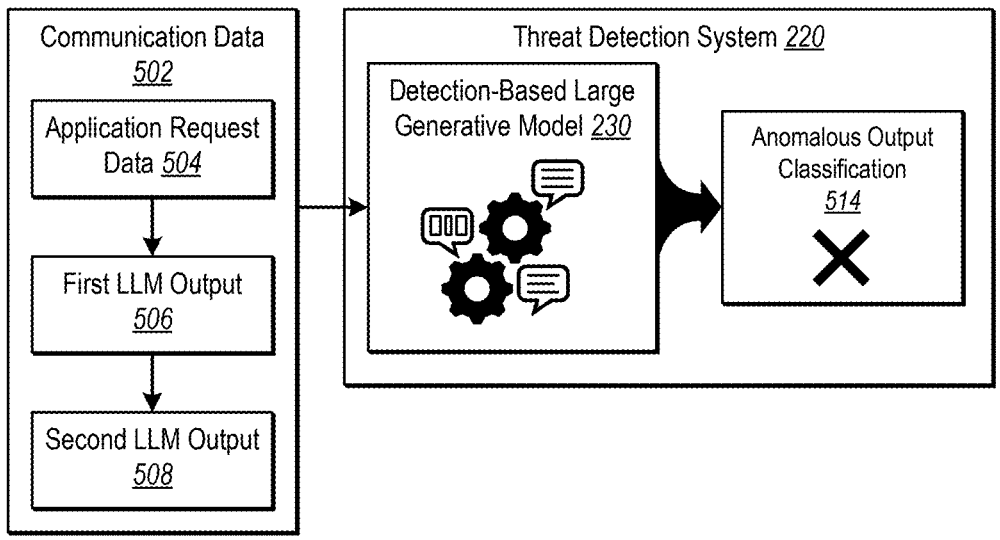

Once trained and/or fine-tuned, in various implementations, the threat detection system 220 uses the detection-based large generative model 230 to automatically generate LLM output classifications. Accordingly, FIGS. 5A-5B illustrate block diagram examples of using the threat detection system 220 to classify LLM output classifications using a trained detection-based large generative model. In particular, FIGS. 5A-5B illustrate example diagrams of using the detection-based large generative model to determine anomalous and non-anomalous large generative language model output classifications.

As shown in FIGS. 5A-5B, the threat detection system 220 includes the detection-based large generative model 230. In these figures, the detection-based large generative model 230 represents a large generative language model tuned to classify the outputs of other LLM models. FIGS. 5A-5B also show the threat detection system 220 providing communication data 502 as input to the detection-based large generative model 230. In various implementations, the communication data 502 includes communications between an application system and the large generative language model used by the application system.

In particular, as shown in FIG. 5A, the communication data 502 includes application request data 504 and a first LLM output 506. For example, the application request data 504 corresponds to the initial application request from an application to an LLM, which includes a system prompt, a user prompt, and/or a list of tools available to the requesting application. The first LLM output 506 corresponds to the initial response provided to the application from the LLM.

As shown in FIG. 5A, the threat detection system 220 uses the detection-based large generative model 230 to determine that the first LLM output 506 has a non-anomalous output classification 512. Accordingly, the threat detection system 220 allows the first LLM output 506 to be provided and performed by the requesting application, as described above. In some instances, the threat detection system 220 also provides the application request data 504 to the detection-based large generative model 230 to provide additional context in determining whether the first LLM output 506 is anomalous.

As described above, the application sends a second application request to the detection-based large generative model 230 in response to the first LLM output 506. The threat detection system 220 does not provide the second application request to the detection-based large generative model 230 as it may include compromised external content. Rather, the threat detection system 220 provides only the additional LLM outputs to the detection-based large generative model 230.

To illustrate, FIG. 5B shows that the communication data 502 also includes a second LLM output 508. The threat detection system 220 provides the second LLM output 508 to the detection-based large generative model 230 to be classified. In some instances, the threat detection system 220 provides the application request data 504 and/or the first LLM output 506 to the detection-based large generative model 230 for additional context. In response to receiving input data, the detection-based large generative model 230 determines that the second LLM output 508 has an anomalous output classification 514. For example, the second LLM output 508 includes actions or instructions for anomalously invoking a tool. Accordingly, the threat detection system 220 prevents the requesting application from implementing the second LLM output 508, as described above.

Figure 6:
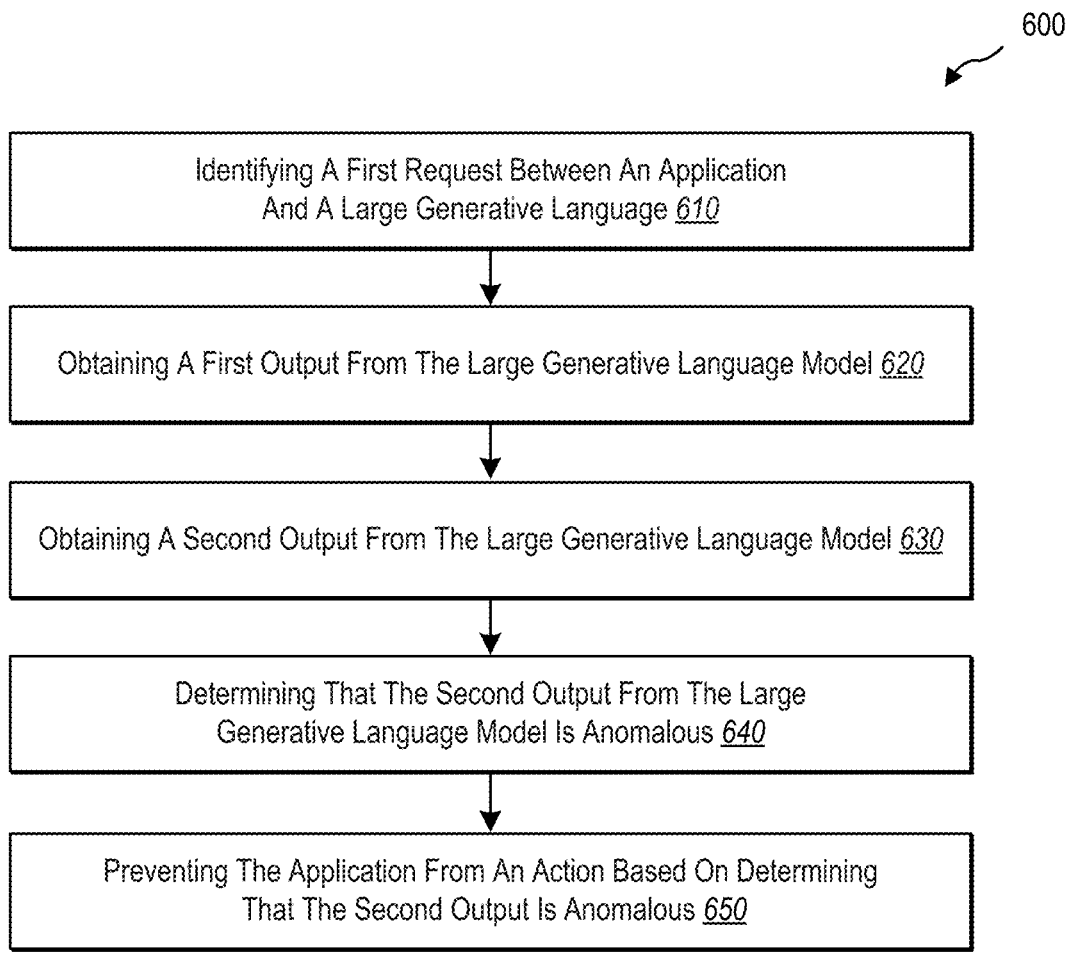
FIG. 6 illustrates an example series of acts of a computer-implemented method for detecting anomalous application actions.

Turning now to FIG. 6, this figure illustrates an example flowchart that includes a series of acts 600 for detecting anomalous application actions according to some implementations. In particular, FIG. 6 illustrates an example series of acts of a computer-implemented method for determining whether outputs from an LLM for an application are anomalous or non-anomalous using a detection-based large generative model according to some implementations.

While FIG. 6 illustrates acts according to one or more implementations, alternative implementations may omit, add to, reorder, and/or modify any of the acts shown. Furthermore, the acts of FIG. 6 can be performed as part of a method (e.g., a computer-implemented method). Alternatively, a computer-readable medium can include instructions that, when executed by a processing system having a processor, cause a computing device to perform the acts of FIG. 6. In some implementations, a system (e.g., a processing system comprising a processor) can perform the acts of FIG. 6. For example, the system includes a processing system and a computer memory including instructions that, when executed by the processing system, cause the system to perform various actions or steps.

As shown, the series of acts 600 includes act 610 of identifying a first request between an application and a large generative language model. For instance, in example implementations, act 610 involves identifying a first application request from an application to a large generative language model, the first application request including a system prompt and a user prompt. In some implementations, in act 610, the first application request also includes tools available (e.g., a list of tools) to the application. In some implementations, the second application request also includes tools available to the application.

As further shown, the series of acts 600 includes act 620 of obtaining a first output from the large generative language model. For instance, in example implementations, act 620 involves obtaining a first output from the large generative language model provided to the application that instructs the application to perform a first action.

In some implementations, act 620 includes determining that the first output from the large generative language model is non-anomalous by using the detection-based large generative model to classify the first output based on the system prompt, the user prompt, and the first output. In some implementations, the application receives external content from an external source in response to performing the first action included in the first output from the large generative language model, and the application provides the external content to the large generative language model with the second application request. In some implementations, the external content includes an indirect prompt injection attack to exploit a vulnerability of the large generative language model.

As further shown, the series of acts 600 includes act 630 of obtaining a second output from the large generative language model. For instance, in example implementations, act 630 involves obtaining a second output from the large generative language model instructing the application to perform a second action in response to the application performing the first action and providing a second application request to the large generative language model.

In some implementations, in act 630, the detection-based large generative model does not receive the second application request that the application provides to the large generative language model. In some implementations, using the detection-based large generative model to determine that the second output from the large generative language model is anomalous includes providing the first application request including the system prompt and the user prompt, the first output, and the second output to the detection-based large generative model; and not providing the second application request to the detection-based large generative model.

As further shown, the series of acts 600 includes act 640 of determining that the second output from the large generative language model is anomalous. For instance, in example implementations, act 640 involves determining that the second output from the large generative language model is anomalous based on using a detection-based large generative model to classify the second output.

In some implementations, act 640 includes determining that the second output from the large generative language model is anomalous based on using a detection-based machine-learning model to classify the second output. In some implementations, the second action includes utilizing a second tool from the tools to access privately stored data. In some implementations, the detection-based large generative model determines that the second output is anomalous based on the tools, the first action, and the second action.

In some implementations, act 640 includes notifying the application not to perform the second action based on determining that the second output is anomalous. In some implementations, the detection-based machine-learning model is a large generative model trained to detect anomalous actions by the application.

As further shown, the series of acts 600 includes act 650 of preventing the application from performing actions in the second output based on determining that the second output is anomalous. For instance, in example implementations, act 650 involves preventing the application from performing the second action based on determining that the second output is anomalous.

In some implementations, act 650 includes notifying the application to not perform the second action based on determining that the second output is anomalous. In some implementations, act 650 includes classifying the external source as a threat actor and preventing future access to the external source by the application. In some implementations, the application and the detection-based large generative model are both within the same cloud computing system.

In some implementations, act 650 includes notifying the application to not perform the second action based on determining that the second output is anomalous. In some implementations, the detection-based machine-learning model is located within a cloud security system that is a separate entity from a different cloud computing system that implements the application. In some implementations, both the detection-based machine-learning model and the application are implemented within a cloud computing system. In some implementations, act 650 also includes preventing the application from performing the second action based on determining that the second output is anomalous.

Figure 7:
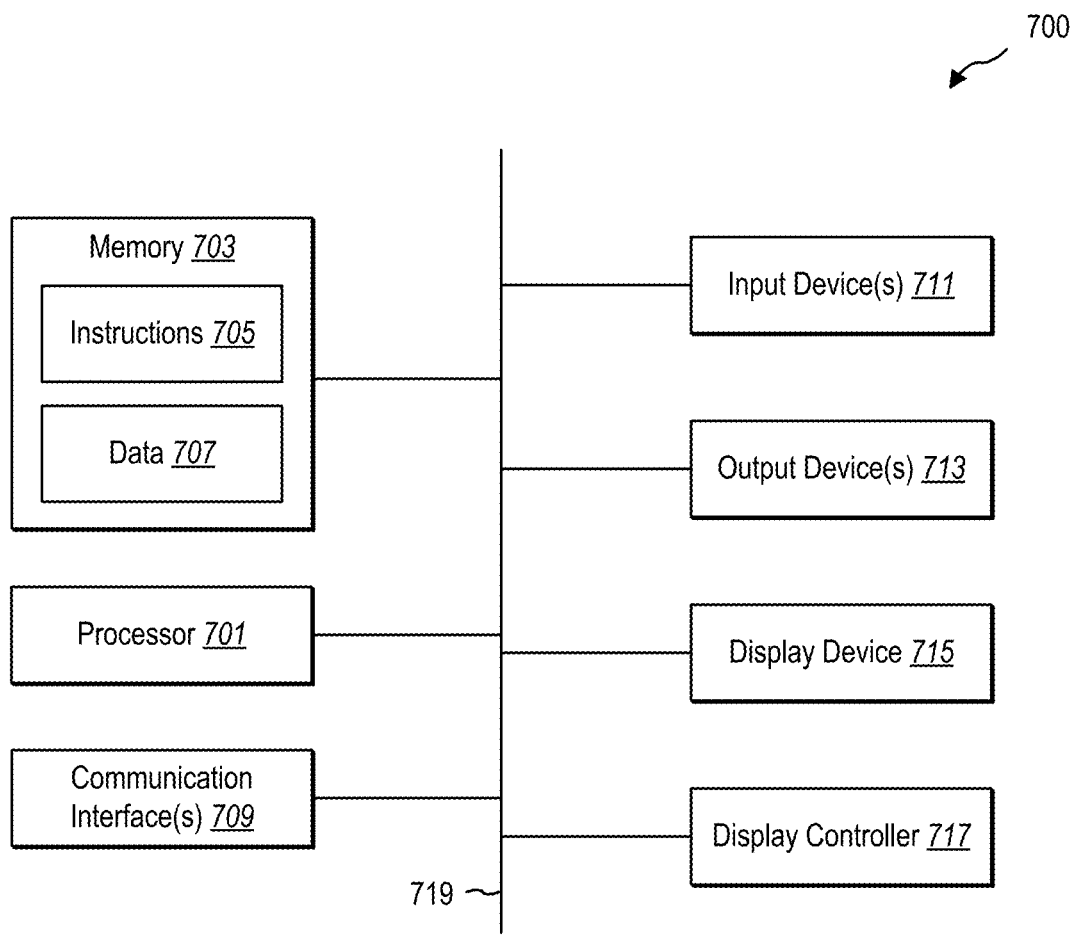
FIG. 7 illustrates example components included within a computer system used to implement the threat detection system.

FIG. 7 illustrates certain components that may be included within a computer system 700. The computer system 700 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 700 represents one or more of the client devices, server devices, or other computing devices described above. For example, the computer system 700 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 700 includes a processing system including a processor 701. The processor 701 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 701 may be referred to as a central processing unit (CPU) and may cause computer-implemented instructions to be performed. Although the processor 701 shown is just a single processor in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 705 and the data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during the execution of the instructions 705 by the processor 701.

A computer system 700 may also include one or more communication interface(s) 709 for communicating with other electronic devices. The one or more communication interface(s) 709 may be based on wired communication technology, wireless communication technology, or both. Some examples of the one or more communication interface(s) 709 include a Universal Serial Bus (USB), an Ethernet adapter, a wireless adapter that operates according to an Institute of Electrical and Electronics Engineers (IEEE) 702.11 wireless communication protocol, a Bluetooth® wireless communication adapter, and an infrared (IR) communication port.

A computer system 700 may also include one or more input device(s) 711 and one or more output device(s) 713. Some examples of the one or more input device(s) 711 include a keyboard, mouse, microphone, remote control device, button, joystick, trackball, touchpad, and light pen. Some examples of the one or more output device(s) 713 include a speaker and a printer. A specific type of output device that is typically included in a computer system 700 is a display device 715. The display device 715 used with implementations disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For clarity, the various buses are illustrated in FIG. 7 as a bus system 719.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for detecting anomalous application actions, comprising:
   identifying a first application request from an application to a large generative language model, the first application request including a system prompt and a user prompt;
   obtaining a first output from the large generative language model provided to the application that instructs the application to perform a first action;
   in response to the application performing the first action and providing a second application request to the large generative language model, obtaining a second output from the large generative language model instructing the application to perform a second action;
   determining that the second output from the large generative language model is anomalous based on using a detection-based large generative model to classify the second output; and
   preventing the application from performing the second action based on determining that the second output is anomalous.

2. The computer-implemented method of claim 1, wherein the detection-based large generative model does not receive the second application request that the application provides to the large generative language model.

3. The computer-implemented method of claim 1, further comprising determining that the first output from the large generative language model is non-anomalous by using the detection-based large generative model to classify the first output based on the system prompt, the user prompt, and the first output.

4. The computer-implemented method of claim 1, wherein using the detection-based large generative model to determine that the second output from the large generative language model is anomalous includes:
providing the first application request including the system prompt and the user prompt, the first output, and the second output to the detection-based large generative model; and
not providing the second application request to the detection-based large generative model.

5. The computer-implemented method of claim 1, wherein:
the application receives external content from an external source in response to performing the first action included in the first output from the large generative language model; and
the application provides the external content to the large generative language model with the second application request.

6. The computer-implemented method of claim 5, wherein the external content includes an indirect prompt injection attack to exploit a vulnerability of the large generative language model.

7. The computer-implemented method of claim 6, wherein:
the first application request also includes tools available to the application;
the first action includes utilizing a first tool from the tools to get the external content from the external source; and
the detection-based large generative model determines that the first output is non-anomalous based on the tools and the first action.

8. The computer-implemented method of claim 7, wherein:
the second action includes utilizing a second tool from the tools to access privately stored data; and
the detection-based large generative model determines that the second output is anomalous based on the tools, the first action, and the second action.

9. The computer-implemented method of claim 7, further comprising preventing future access to the external source by the application based on classifying the external source as a threat.

10. The computer-implemented method of claim 1, wherein the second application request also includes tools available to the application.

11. The computer-implemented method of claim 1, further comprising notifying the application not to perform the second action based on determining that the second output is anomalous.

12. The computer-implemented method of claim 1, wherein the application and the detection-based large generative model are both within a same cloud computing system.

13. The computer-implemented method of claim 12, further comprising blocking the application from performing the second action based on determining that the second output is anomalous.

14. A computer-implemented method for detecting anomalous application actions, comprising:
identifying a first application request from an application to a large generative language model, the first application request including a system prompt and a user prompt;
obtaining a first output from the large generative language model provided to the application that instructs the application to perform a first action;
in response to the application performing the first action and providing a second application request to the large generative language model, obtaining a second output from the large generative language model instructing the application to perform a second action;
determining that the second output from the large generative language model is anomalous based on using a detection-based machine-learning model to classify the second output; and
notifying the application to not perform the second action based on determining that the second output is anomalous.

15. The computer-implemented method of claim 14, wherein the detection-based machine-learning model is located within a cloud security system that is a separate entity from a cloud computing system that implements the application.

16. The computer-implemented method of claim 14, wherein the detection-based machine-learning model and the application are implemented within a cloud computing system.

17. The computer-implemented method of claim 16, further comprising preventing the application from performing the second action based on determining that the second output is anomalous.

18. The computer-implemented method of claim 14, wherein the detection-based machine-learning model is a large generative model trained to detect anomalous actions by the application.

19. A system for detecting anomalous application actions, the system comprising:
a processing system; and
a computer memory comprising instructions that, when executed by the processing system, cause the system to perform operations of:
identifying a first application request from an application to a large generative language model, the first application request including a system prompt, a user prompt, and tools available to the application;
obtaining a first output from the large generative language model provided to the application that instructs the application to perform a first action with a first tool from the tools;
in response to the application performing the first action with the first tool and providing a second application request to the large generative language model, obtaining a second output from the large generative language model instructing the application to perform a second action;
determining that the second output from the large generative language model is anomalous based on using a detection-based large generative model to classify the second output; and
preventing the application from performing the second action based on determining that the second output is anomalous.

20. The system of claim 19, wherein the detection-based large generative model does not receive the second application request that the application provides to the large generative language model.

* * * * *